US007297383B2

(12) United States Patent
Fuemmeler

(10) Patent No.: US 7,297,383 B2
(45) Date of Patent: Nov. 20, 2007

(54) NEWSPAPER COVER WITH ATTACHED ADVERTISING OVERLAY AND DETACHABLE COUPON AND PROCESS

(75) Inventor: Carl D. Fuemmeler, Columbia, MO (US)

(73) Assignee: Mexico Plastic Company, Mexico, MO (US)

(*) Notice: Subject to any disclaimer, the term of this patent is extended or adjusted under 35 U.S.C. 154(b) by 117 days.

(21) Appl. No.: 10/912,800

(22) Filed: Aug. 6, 2004

(65) Prior Publication Data

US 2005/0031810 A1 Feb. 10, 2005

Related U.S. Application Data

(60) Provisional application No. 60/493,889, filed on Aug. 8, 2003.

(51) Int. Cl.
*B32B 3/02* (2006.01)

(52) U.S. Cl. ............... 428/35.2; 229/87.01; 229/87.06; 383/38; 383/39; 40/674

(58) Field of Classification Search ............... 428/34.1, 428/35.2; 229/87.01, 87.06; 40/649, 661, 40/661.08, 674; 206/449, 424; 281/19.1, 281/4, 45; 383/38, 39, 40
See application file for complete search history.

(56) References Cited

U.S. PATENT DOCUMENTS

| | | | |
|---|---|---|---|
| 1,541,167 A | | 6/1925 | Mulvey |
| 2,628,878 A | * | 2/1953 | Slonneger .................. 312/201 |
| 3,762,628 A | | 10/1973 | Sargent |
| 3,998,135 A | | 12/1976 | Sargent |
| 4,065,049 A | | 12/1977 | Achelpohl et al. |
| 5,352,041 A | * | 10/1994 | Fullerton et al. ............. 383/5 |
| 5,738,263 A | | 4/1998 | Lewis |
| 5,851,069 A | | 12/1998 | Davoren |
| 6,234,673 B1 | | 5/2001 | Tonoff |
| 6,609,613 B2 | | 8/2003 | Schneider et al. |

* cited by examiner

*Primary Examiner*—Alexander S. Thomas
(74) *Attorney, Agent, or Firm*—Polster Lieder Woodruff & Lucchesi, LC

(57) ABSTRACT

A combination paper cover and attached overlay with a detachable advertising coupon attached to the overlay. A method of making the cover and overlay using a folded sheet of heat sealable material for the cover and a printed single sheet of a heat-sealable material for the overlay in which the single sheet is placed over the folded sheet with a free end projecting past the folded edge of the cover, the edge is perforated to form a line of weakness to define the coupon, and the cover and overlay are heat sealed together along their side edges and formed into individual units simultaneously.

12 Claims, 2 Drawing Sheets

NEWSPAPER COVER WITH ATTACHED ADVERTISING OVERLAY AND DETACHABLE COUPON AND PROCESS

CROSS REFERENCE TO RELATED APPLICATIONS

This application is related to U.S. Provisional Patent Application 60/493,889 filed Aug. 8, 2003 from which priority is claimed.

FIELD OF THE INVENTION

This invention relates to plastic newspaper covers, and more particularly, to thin plastic covers for newspapers which have an overlay with advertising printed on the outer surface thereof with an attached severable coupon.

BACKGROUND OF THE INVENTION

For many years newspapers were simply rolled and bound by wire or string before being thrown onto customers' lawns, porches or driveways. With the advent of thin film plastics, it became customary to fold or roll the newspaper and to enclose the folded or rolled newspaper in a sleeve of plastic before being thrown onto the customer's property. The plastic film had the advantage of protecting the paper from rain, snow, etc. The thin film plastic packages may be clear, colored, and in some instances have advertising printed on the package walls. It is also common place to distribute advertising flyers including coupons in newspapers and by direct mail. Samples of products also are distributed by direct mail.

SUMMARY OF THE INVENTION

This invention is embodied in a thin plastic sleeve for distributing newspapers and a separate plastic overlay attached to the sleeve and a severable coupon attached to one end thereof. The invention also embodies the process for making the sleeve and package.

DESCRIPTION OF THE DRAWINGS

In the drawings, wherein like numbers and letters refer to like parts wherever they occur.

DETAILED DESCRIPTION

Figure 1:
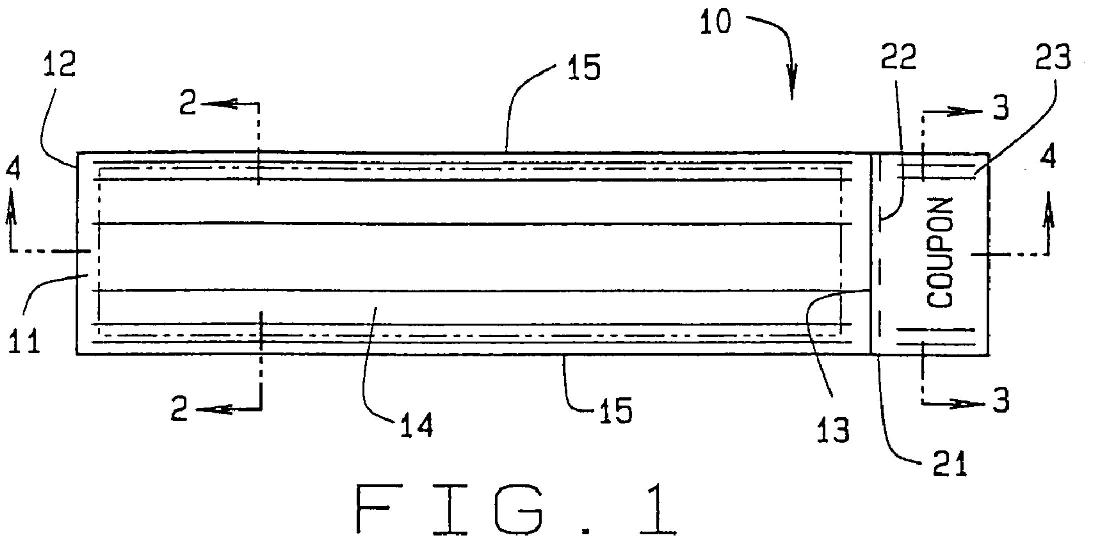
FIG. 1 is a detailed plan view of a folded newspaper enclosed in the sleeve of this invention.
Figure 2:
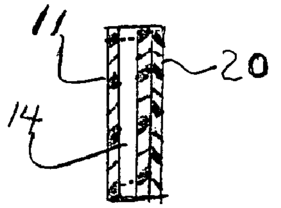
FIG. 2 is a sectional view taken along line 2-2 of FIG. 1.
Figure 3:
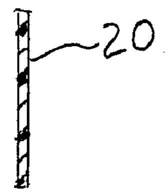
FIG. 3 is a sectional view taken along line 3-3 of FIG. 1.
Figure 4:
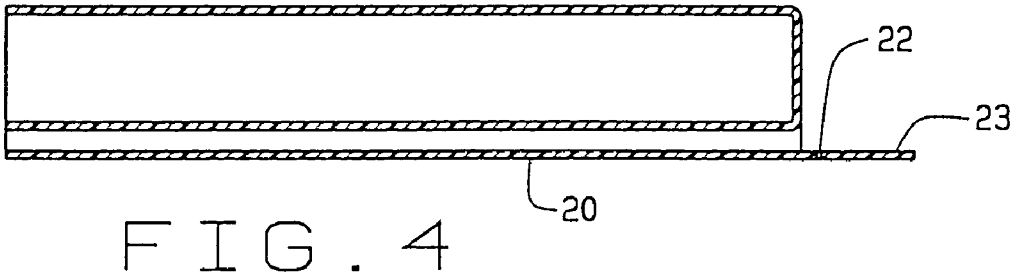
FIG. 4 is a sectional view taken along line 4-4 of FIG. 1.

FIG. 1 shows the combined newspaper cover sleeve and advertising overlay and severable coupon package 10 which comprises a sleeve 11 which has an open end 12 and a closed or sealed end 13. A folded newspaper 14 is positioned inside the sleeve 11.

Attached to the sleeve 11 along the side edges 15 is an advertising overlay 20. The overlay 20 is attached only at the side edges 15 and has an extension flap or free edge 21 which extends past the closed end 13 of the sleeve 11.

The advertising overlay 20 has a line of perforations 22 in the flap 21 which defines a line of weakness allowing the end of the flap, on which is printed a coupon 23, to be severed from the overlay 20.

Advertising indicia 24 preferably is printed on the outer surface of the overlay 20.

Figure 5:
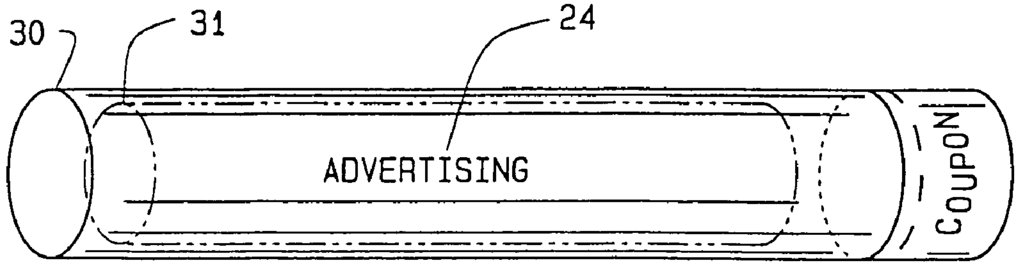
FIG. 5 is a perspective view of the invention showing a rolled newspaper enclosed in the sleeve of this invention.

FIG. 5 shows a modification of the invention in which the sleeve 30 is more cylindrical and the newspaper 31 is rolled and inserted into the sleeve 30.

Figure 6:
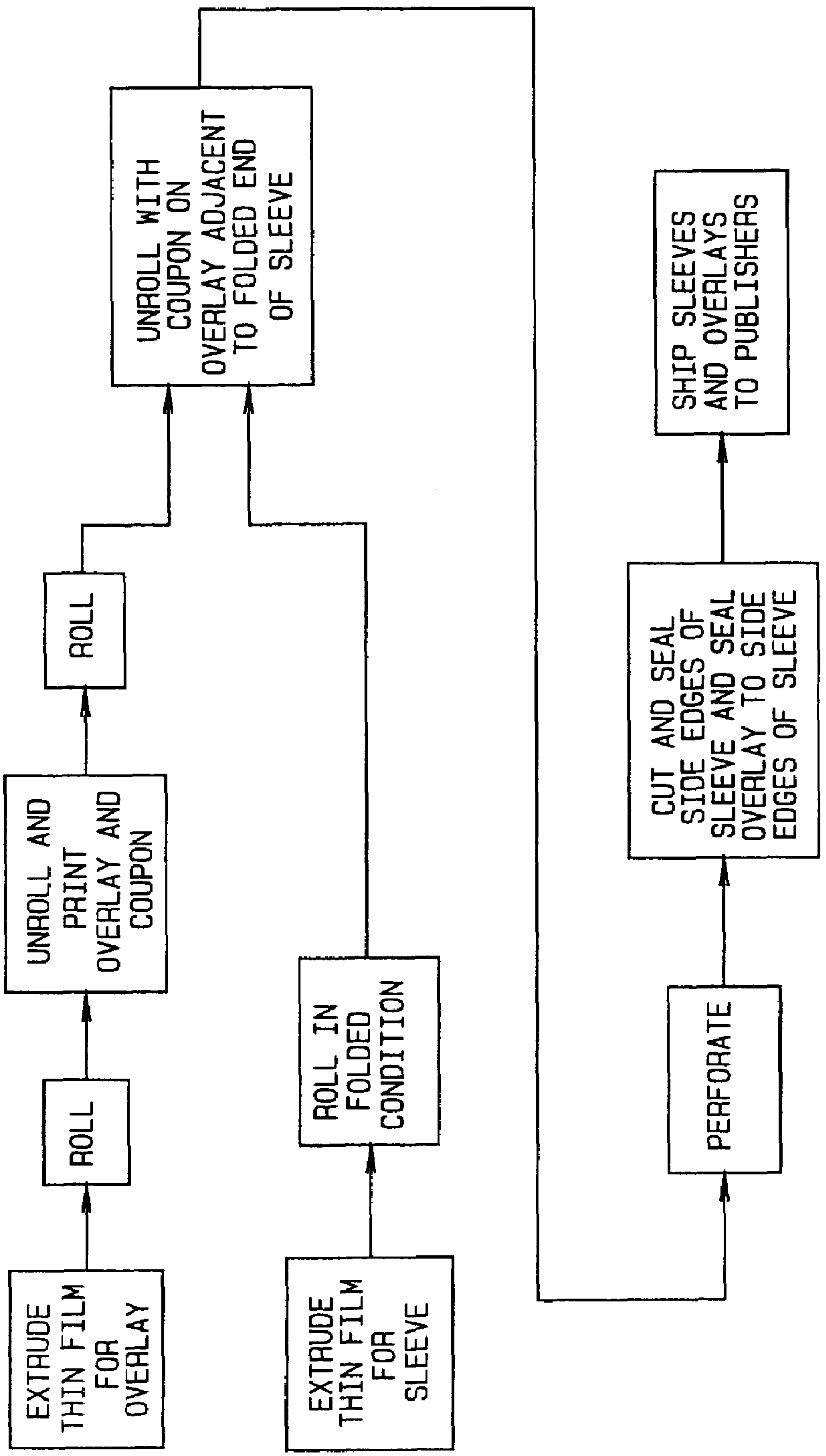
FIG. 6 is a diagrammatic block diagram of the process of making the sleeve and advertising overlay and coupon of this invention.

FIG. 6 shows a flow diagram of the process for making this invention. The sleeve 11 is first extruded as a single sheet of thin plastic. This is folded lengthwise and formed into onto a roll. The overlay 20 likewise is a single sheet of thin extruded plastic film, which also is formed in a roll.

When an order is received, the overlay 20 is unrolled and printed with the appropriate indicia and the coupon also is printed on the free edge flap. The printed overlay 20 is re-rolled and both the folded sleeve 11 and the printed overlay 20 then are unrolled and located such that one edge of the overlay 20 is aligned with the sleeve open end 12 and the free edge 21 extends outwardly of and past the sleeve closed in 13. The free edge flange 21 is perforated at 22 to define the coupon 21.

To form the products 10, a hot knife is used to simultaneously sever and seal the sleeve side edges 15 and to sever the side edges of the overlay 20. This also heat seals the overlay 20 to the sleeve 13 along the edges 15.

The combined sleeve and overlay package 10 is then shipped to the publisher, distributor, etc., where the newspaper is placed in the sleeve 11 and the package 10 is distributed to the homeowners.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

What is claimed is:

1. A combination newspaper cover and attached overlay comprising:

a sleeve defined by a single sheet of flexible heat sealable polymeric material having a fold at one end to define, closed end, and an open end with closed side edges, and an overlay of a single sheet of flexible heat sealable material, said overlay having side edges aligned with the side edges of the sleeve and attached to the sleeve by heat seals only along the sleeve side edges, the overlay also having a free end portion which extends past the closed end of the sleeve and means defining a line of severance to allow the free end portion to be severed from the remainder of the overlay, the sleeve open end accepting a newspaper after the overlay is attached.

2. The combination of claim 1 wherein the free end portion of the overlay has an advertising coupon formed thereon.

3. The combination of claim 1 wherein the free end of the overlay is defined by a line of weakness whereby it is readily severable from the remainder of the overlay.

4. The combination of claim 1 including advertising indicia on an outside surface of the overlay.

5. The combination of claim 1 wherein the side edges of the sleeve are formed by heat-seals co-extensive with the overlay side edge heat seals.

6. A combination paper cover and attached overlay comprising:

a sleeve defined by opposed substantially coextensive sides and having a closed end, an open end and closed side edges, and an overlay which extends over substantially the entire length of the sleeve and is attached to the sleeve only along its side edges, the overlay also having a free end portion which extends past one end of the sleeve and is defined by a line of weakness whereby it is severable from the remainder of the overlay.

7. The combination of claim 6 wherein the free end portion of the overlay has an advertising coupon formed thereon.

8. The combination of claim 6 wherein the sleeve is adapted to contain a newspaper.

9. The combination of claim 6 including advertising indicia on an outside surface of the overlay.

10. The combination of claim 6 wherein the sleeve is a single sheet of thin flexible polymeric material with the closed end being formed by a fold line and the closed end is adjacent to the free end portion of the overlay.

11. The combination of claim 10 wherein the side edges of the sleeve are formed by heat-seals.

12. The combination of claim 11 where the side edges of the overlay are heat-sealed to the side edges of the sleeve.

* * * * *